3,382,274
SYNTHESIS OF ESTERS
Donald M. Fenton, Anaheim, Calif., assignor to Union Oil Company of California, Los Angeles, Calif., a corporation of California
No Drawing. Filed Sept. 8, 1964, Ser. No. 395,035
5 Claims. (Cl. 260—484)

ABSTRACT OF THE DISCLOSURE

The invention comprises oxidation of alpha,beta-ethylenically unsaturated aldehydes to esters by contacting the aldehydes with a primary alcohol and a soluble mercuric salt. The resultant ester of a beta-alkoxy substituted carboxylic acid can then be pyrolyzed to prepare the ester of an unsaturated carboxylic acid, e.g., acrolein can be oxidized to an alkyl-beta-alkoxy propionate and then pyrolyzed to produce an alkyl acrylate. The mercuric salt is reduced to metallic mercury in the oxidation.

---

This invention relates to the preparation of esters of alkanoic acids including esters of beta-alkoxyalkanoic and beta-hydroxyalkanoic acids which find their chief use as precursors of esters of unsaturated carboxylic acids, obtained therefrom by pyrolysis.

The process of this invention comprises the reaction of aliphatic, alpha,beta-ethylenically unsaturated aldehydes with aliphatic or alicyclic primary alcohols in the presence of mercuric ion to yield the esters of beta-alkoxy aliphatic carboxylic acids. Coincident with the oxidation of the aldehyde is the reduction of the mercuric ion to metallic mercury.

The reaction can be performed under relatively mild conditions including temperatures from about 5° to about 350° C. and pressures sufficient to maintain liquid phase conditions, preferably from about atmospheric to 100 atmospheres and adequate reaction time to complete the oxidation as observed by the reactants achieving a steady state or autogenic pressure or by complete reduction of the mercuric ion to mercury.

The reactant alcohol employed can be any desired primary alcohol corresponding to the particular alkyl group desired in the ester. Generally, alicyclic and aliphatic primary monohydroxy alcohols having from one to about 25 carbons can be employed e.g., methanol, ethanol, propanol, butanol, isobutanol, amyl alcohol, isoamyl alcohol, hexanol, cyclohexanol, isohexanol, heptanol, isoheptanol, 3-methylhexanol-1, lauryl alcohol, 3,4-diethylhepatanol-1, 4-ethylhexanol, cyclohexyl carbinaol, etc. Preferably, low molecular weight alcohols having 1 to about 12 carbons are used.

The remainder of the reaction medium can be any organic solvent that is liquid at the reaction condition and is inert to the reactants, e.g., inert to mercuric salts, alcohols and to the ester. The particular alcohol employed as a reactant can be used in excess and thus comprise the reaction solvent. This is the preferred embodiment since it simplifies the product recovery steps. If desired, however, other organic solvents can be employed including various ethers such as: methyl ethyl ether, diethyl ether, diisopropyl ether, diisoamyl ether, ethyl benzyl ether, diethylene glycol diethyl ether, triethylene glycol diethyl ether, tetraethylene glycol dimethyl ether, etc.

Various esters can also be employed as the solvent, e.g., methyl formate, ethyl formate, methyl acetate, ethyl acetate, n-propyl formate, isopropyl acetate, ethyl propionate, n-butyl formate, sec-butyl acetate, isobutyl acetate, ethyl n-butylate, n-butyl acetate, isoamyl acetate, n-amyl acetate, glycol diformate, isoamyl n-butyrate, diethyl oxalate, glycol diacetate, isoamyl isovalerate, methyl benzoate, n-dibutyl oxalate, etc.

The saturated hydrocarbons can of course be used as suitable inert solvents, e.g., pentane, hexane, heptane, octane, decane, dodecane, kerosene, naphtha, etc.

The mercuric salts that can be employed are those soluble in the reaction medium. Included in such salts are the soluble inorganic mercuric salts such as the nitrate and carboxylates of the lower molecular weight carboxylic acids, e.g., mercuric nitrate, mercuric acetate, mercuric propionate, mercuric butyrate, mercuric pentonate, etc. Of these, mercuric carboxylates having from 1 to about 12 carbons can be used; those having from 1 to about 5 carbons are preferred and mercuric acetate is most preferred.

In general, any alpha,beta-ethylenically unsaturated aldehyde can be employed in my invention. Aldehydes having from about 3 to about 12 carbons can be employed and, preferably, aldehydes having from 3 to about 6 carbons are employed. The aldehydes can be aliphatic or alicyclic hydrocarbon aldehydes and most preferably acrolein is employed. Examples of suitable aldehydes are: acrolein, methacrolein, crotonic aldehyde, alpha-beta-dimethylacrolein, beta-dimethylacrolein, alpha-methyl-beta-ethylacrolein, alpha-ethyl-beta - n - propylacrolein, alpha-ethyl-beta-cyclohexylacrolein.

The reaction simply comprises mixing the aforementioned aldehyde with one or more of the aforementioned alcohols in the presence, optionally, of any of the aforementioned solvents and the mercuric salts. The reaction can be run in either one or two stages. In the single stage the reactants are heated to the desired reaction temperature between about 150 and about 250° C., preferably between about 170 and about 200° C., and under sufficient pressure to maintain liquid phase conditions, generally between about 1 and about 10 atmospheres. The two stage reaction is conducted in its first stage at temperatures from room temperature to 100° and then in its second stage from 150° to 250° C. The first stage comprises the addition of mercury to the olefinic bond and hence completion of the first stage reaction can be observed by spectroscopically inspecting the reactants or sample thereof for determining disappearance of the olefin bond. Upon substantial elimination of this double bond, the reactants can be heated to the temperature of the second stage.

The reaction can be monitored by sampling and titrating the samples to determine an increase in acidity, by weighing the mercury formed or by spectroscopic means, such as the appearance of ester groupings and the disappearance of aldehyde groupings.

The crude reaction product can be readily decanted to separate the organic compound products from the mercury and the former are treated to recover the product of the reaction, i.e., the ester of the beta-alkoxy substituted carboxylic acid in any conventional manner. Generally, distillation is employed to recover the desired product and the degree of separation effected in the distillation can be enhanced by conventional use of solvents or azeotrope formers in extractive distillation or azeotropic distillation according to the conventional practice of the art. If desired, however, solvent extraction can also be employed to recover the product.

The mercury separated from the crude reaction product can thereafter be subjected to known oxidizing conditions to return it to a soluble salt suitable for recycling to the reaction. When the salt comprises a mercuric carboxylate, such as mercuric acetate, the mercury can be admixed with the carboxylic acid, i.e., acetic acid, and oxidized with known oxidizing agents to prepare the mercuric carboxylate for return to the reaction zone. Oxidizing agents such as nitric acid, chromic acid, permanganates, ozone, hydrogen peroxide, etc., can be employed with or without oxygen under temperatures from about 0° to about 250° C. to reoxidize the mercury to a mercuric salt suitable for recycling.

The following examples will serve to illustrate the mode of practicing my invention:

EXAMPLE 1

A steel bomb of about 300 milliliters capacity was charged with 10 grams of acrolein, 100 milliliters n-butanol and 31 grams of mercuric acetate. The reactants were heated to 40° C. and held at this temperature for 2 hours, while rocking, and then heated to 200° C. and held at that temperature for three hours. At the end of the reaction period, the reactants were cooled and the organic phase was separated from the mercury and distilled to recover acetic acid, n-butanol, slight amounts of water and n-butyl acetate, together with one milliliter of a n-butyl-beta-n-butoxypropionate, boiling point 43–70°/3 millimeters mercury pressure, refractive index of 1.4208 at 23° C. with a infrared spectrum consistent for n-butyl-beta-n-butoxy-propionate.

EXAMPLE 2

The aforedescribed bomb was charged with 20 grams of methacrolein, 50 grams mercuric acetate and 80 milliliters n-butanol. The reactants were heated to 40° C. and held at that temperature for 2 hours and then heated to 110° C. and held at that temperature for 2 hours and then heated to 200° C. and held at that temperature for 2 hours, while rocking the bomb. After the reaction period, the reactants were cooled, the bomb was opened and the organic phase separated from the mercury. The organic phase was distilled to obtain 8 grams of a liquid fraction having a normal boiling point at 2 millimeters mercury pressure of 78–81° C., a refractive index of 1.4505 at 25° C. and an infrared spectrum consistent with n-butyl-beta-n-butoxy-isobutyrate.

The foregoing examples are intended solely to illustrate a mode of practicing the invention and are not to be construed as unduly limiting thereof. My invention is intended to be defined solely by the method steps and their obvious equivalents set forth in the following claims.

I claim:

1. The oxidation of an alpha,beta-ethylenically unsaturated hydrocarbon aldehyde having from about three to about 12 carbons to prepare an ester of a beta-alkoxy substituted carboxylic acid that comprises contacting said aldehyde with a liquid reaction medium consisting essentially of primary alcohol selected from the class consisting of aliphatic and alicyclic primary alcohols having from about 1 to about 25 carbons in the presence of a soluble mercuric salt selected from the class consisting of mercuric nitrate and soluble mercuric carboxylates having from 1 to about 12 carbons at a temperature between about 5° and about 350° C. and sufficient pressure to maintain liquid phase conditions.

2. The oxidation of acrolein to an alkyl-beta-alkoxy propionate that comprises contacting acrolein with a liquid reaction medium consisting essentially of primary alcohol selected from the class consisting of aliphatic and alicyclic primary alcohols having from about 1 to about 25 carbons in the presence of a mercuric salt selected from the class consisting of mercuric acetate and nitrate at a temperature between about 20° and about 250° C. and sufficient pressure to maintain liquid phase conditions.

3. The oxidation of alpha,beta-ethylenically unsaturated hydrocarbon aldehydes having from about 3 to about 12 carbons that comprises contacting said aldehyde with liquid reaction medium consisting essentially of aliphatic primary alcohol having from about 1 to about 5 carbons in the presence of a mercuric carboxylate having from about 1 to about 12 carbons at a temperature between about 20° and about 250° C. and sufficient pressure to maintain liquid phase conditions.

4. The oxidation of claim 3 wherein said aldehyde is acrolein and the product of said oxidation is an alkyl, beta-alkoxypropionate.

5. The oxidation of claim 4 wherein said aldehyde is methacrolein and the product of said oxidation is an alkyl, beta-alkoxyisobutyrate.

References Cited

UNITED STATES PATENTS

| | | | |
|---|---|---|---|
| 3,221,045 | 11/1965 | McKeon et al. | 260—497 |
| 3,257,448 | 6/1966 | Clark et al. | 260—484 |
| 3,277,158 | 10/1966 | Schaeffer | 260—530 X |

LORRAINE A. WEINBERGER, *Primary Examiner.*

A. P. HALLUIN, *Assistant Examiner.*